`US010339932B2`

(12) United States Patent
Nicholson et al.

(10) Patent No.: US 10,339,932 B2
(45) Date of Patent: Jul. 2, 2019

(54) AUDIO INPUT ACTIVATION BASED ON THERMAL DATA DETECTION

(71) Applicant: Lenovo (Singapore) Pte. Ltd., Singapore (SG)

(72) Inventors: John Weldon Nicholson, Cary, NC (US); Daryl Cromer, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/606,505

(22) Filed: May 26, 2017

(65) Prior Publication Data

US 2018/0342247 A1    Nov. 29, 2018

(51) Int. Cl.
| | | |
|---|---|---|
| G10L 15/00 | (2013.01) | |
| G10L 15/24 | (2013.01) | |
| G10L 25/78 | (2013.01) | |
| H04R 3/00 | (2006.01) | |
| H04R 29/00 | (2006.01) | |
| G01V 9/00 | (2006.01) | |
| G10L 15/30 | (2013.01) | |
| G06F 3/16 | (2006.01) | |

(52) U.S. Cl.
CPC ............. *G10L 15/24* (2013.01); *G01V 9/005* (2013.01); *G10L 15/30* (2013.01); *G10L 25/78* (2013.01); *H04R 3/00* (2013.01); *H04R 29/004* (2013.01); *G06F 3/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0107696 | A1* | 8/2002 | Thomas | G10L 15/26 704/275 |
| 2014/0165083 | A1* | 6/2014 | Atkin | G06Q 30/02 725/5 |
| 2016/0232341 | A1* | 8/2016 | Alameh | G06F 21/35 |
| 2016/0260431 | A1* | 9/2016 | Newendorp | G10L 15/32 |
| 2018/0025733 | A1* | 1/2018 | Qian | G10L 25/78 704/275 |

* cited by examiner

*Primary Examiner* — Vu B Hang
(74) *Attorney, Agent, or Firm* — Ference & Associates LLC

(57) ABSTRACT

One embodiment provides a method, including: detecting, using at least one thermal sensor associated with an information handling device, thermal data, determining, using a processor, if the thermal data is associated with a human; and activating, based on determining that the thermal data is associated with a human, at least one audio input device associated with the information handling device. Other aspects are described and claimed.

20 Claims, 3 Drawing Sheets

AUDIO INPUT ACTIVATION BASED ON THERMAL DATA DETECTION

BACKGROUND

Information handling devices ("devices"), for example smart phones, tablet devices, laptop computers, smart speakers, and the like, are capable of receiving user input from one of a number of various input devices (e.g., vocal input provided to a microphone, touch input provided to a display screen, etc.). In order to receive user input, an input device associated with the device must be in an on, or active, state. When in the active state, the input device consumes a particular amount of power (e.g., from a battery associated with the device, etc.).

BRIEF SUMMARY

In summary, one aspect provides a method, comprising: detecting, using at least one thermal sensor associated with an information handling device, thermal data, determining, using a processor, if the thermal data is associated with a human; and activating, based on determining that the thermal data is associated with a human, at least one audio input device associated with the information handling device.

Another aspect provides an information handling device, comprising: at least one thermal sensor associated with the information handling device; a processor; a memory device that stores instructions executable by the processor to: detect thermal data; determine if the thermal data is associated with a human; and activate, based on determining that the thermal data is associated with a human, at least one audio input associated with the information handling device.

A further aspect provides a product, comprising: at least one thermal sensor associated with the product; a storage device that stores code, the code being executable by a processor and comprising: code that detects thermal data; code that determines if the thermal data is associated with a human; and code that activates, based on determining that the thermal data is associated with a human, at least one audio input device associated with the product.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
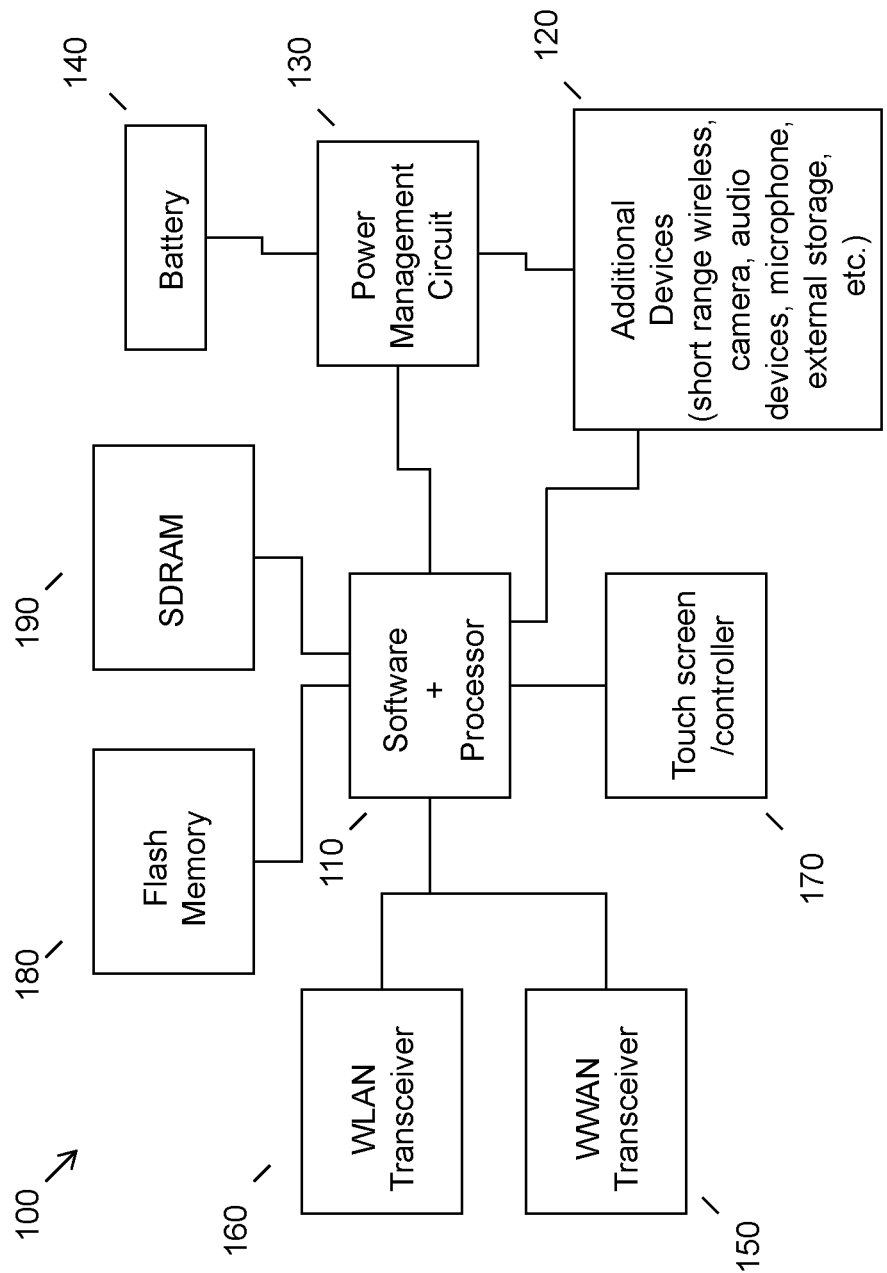
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many devices may be disposed with a variety of always-on technologies, such as microphones, cameras, ambient light sensors, and the like. Conventionally, these always-on technologies are capable of continuously being able to accept input (e.g., user input, ambient sound or light input, picture input, etc.). For example, a digital assistant (e.g., Alexa® for Amazon®, Siri® for Apple®, Cortana® for Microsoft®, etc.) may contain a microphone that may continuously listen for a trigger phrase followed by a user command or query. Responsive to receiving the trigger phrase, the digital assistant may process the command and perform a corresponding action. However, by continuously maintaining certain devices in an active state, a significant amount of power may be consumed from a device's power source (e.g., a device's battery, etc.) or a power source a device is connected to (e.g., an outlet associated with an electrical source, etc.). For example, an always on microphone disposed on a smart phone may drain the phone's battery much faster than if the phone did not maintain the microphone in a continuously active state.

In the case of always-on microphones that listen for voice triggers, the existing solution for minimizing power consumption consists of several steps. First, for devices that have a plurality of microphones, only one microphone of the plurality of microphones may be maintained in an active state. The voice trigger is then implemented in a low-power digital signal processor (DSP) to enable the application processor (AP) to go to a low power mode. The DSP is then placed into a low-power mode and a very simple voice activity detector is the only processing available. If the signal power on the microphone stays below the voice activity detection (VAD) threshold, nothing else is powered. Another conventional power saving technique for always-on technologies involves duty cycling. These existing solutions are generally implemented in dedicated, low-power processors, but, as with the other techniques, the device still stays on at all times.

Accordingly, an embodiment may provide a method for activating an audio input device responsive to detecting thermal data associated with a human user. In an embodiment, thermal data associated with a human user may be detected by a thermal sensor (e.g., a thermopile sensor, etc.)

associated with a device (e.g., integrally connected to the device, integrally connected to another device and capable of communicating thermal data to the device, a combination thereof, etc.). Responsive to determining that the thermal data is associated with a human user, and not another thermal entity (e.g., a pet, another animal, etc.), an embodiment may then activate an audio input device (e.g., a microphone, etc.), or another application or sensor, associated with the device. Such a method conserves device battery power by only activating an audio input device, or other technologies associated with the device sensors, when one or more human users are around to provide input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
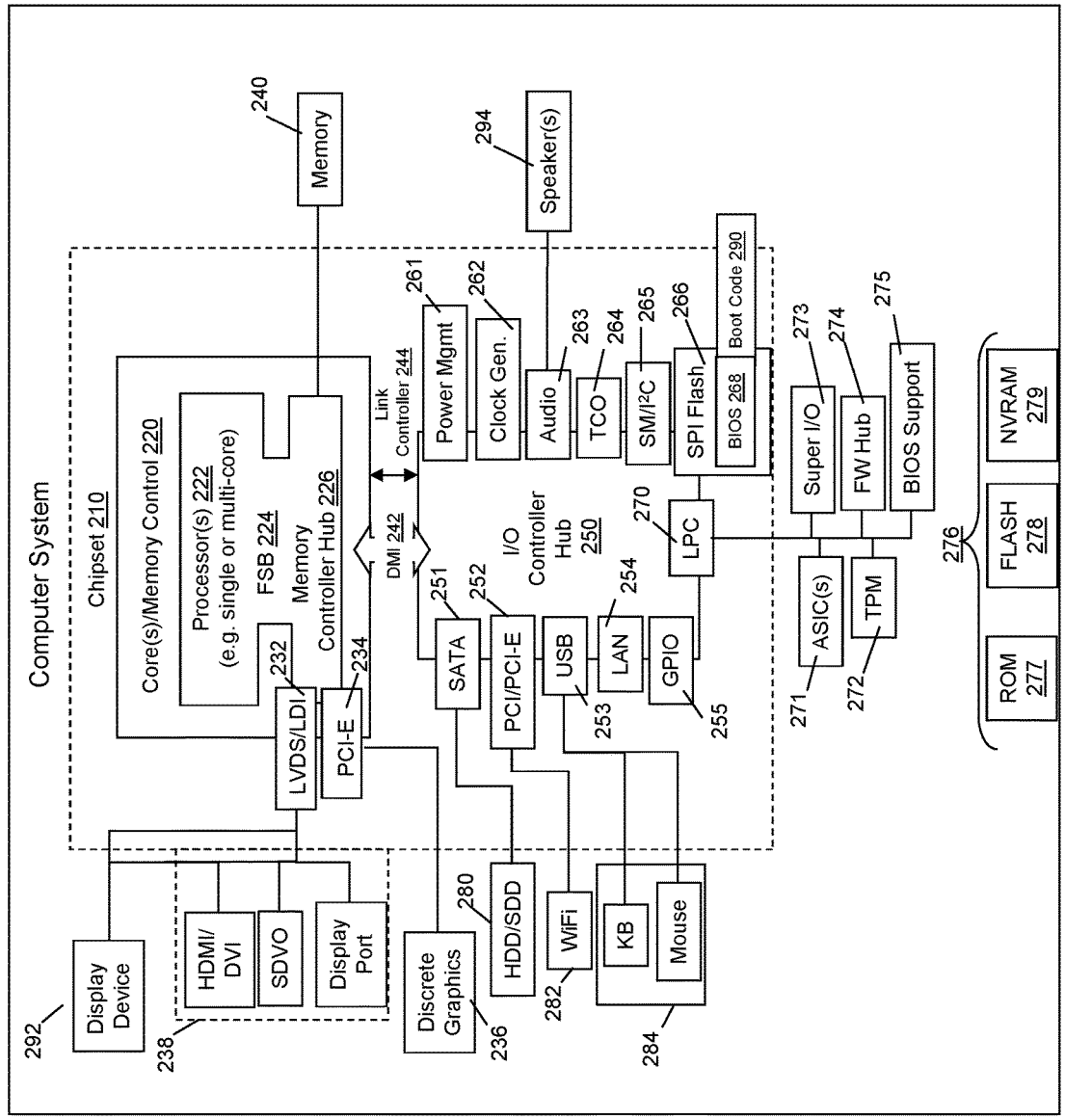
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which a user may use and may include communication applications, such as a digital assistant, that enable users to provide input to the device. For example, the circuitry outlined in FIG. 1 may be implemented in a tablet or smart phone embodiment, whereas the circuitry outlined in FIG. 2 may be implemented in a personal computer embodiment.

Figure 3:
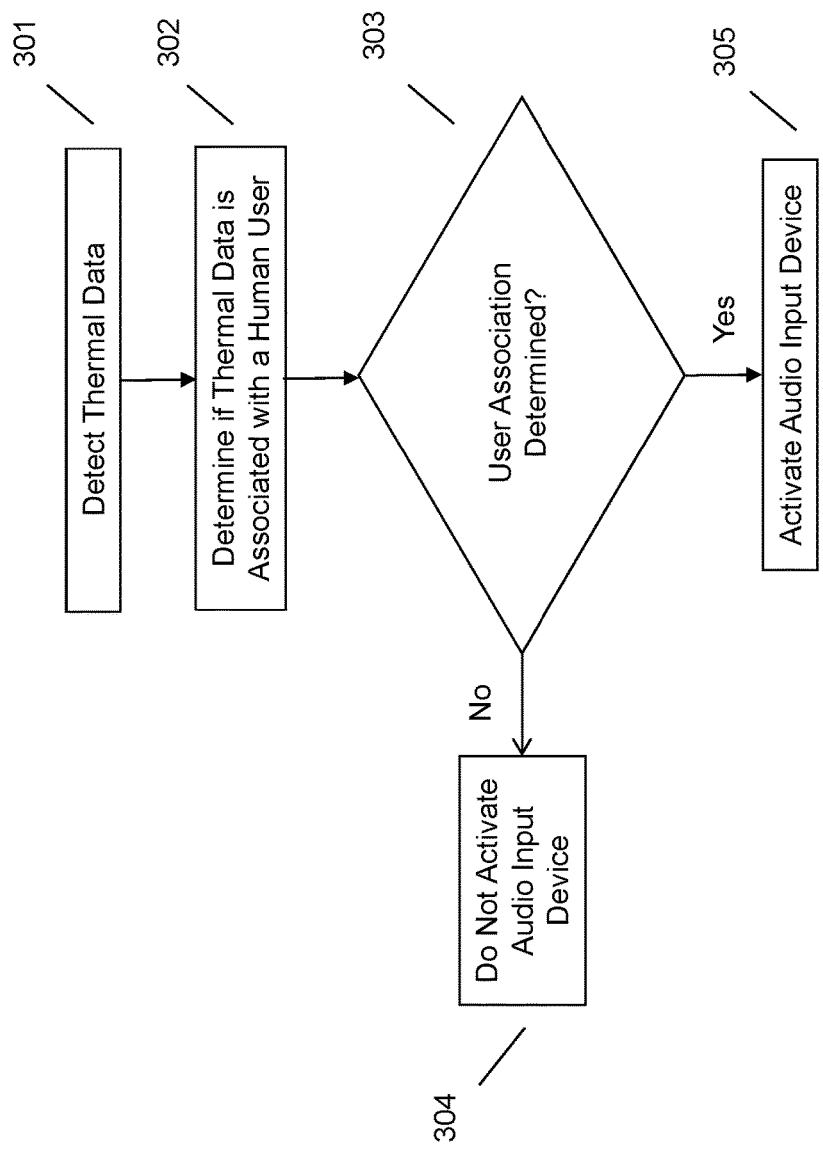
FIG. 3 illustrates an example method of activating an audio input device responsive to detecting thermal data associated with a nearby human user.

Referring now to FIG. 3, an embodiment may provide methods for activating an audio input device responsive to detecting that a human user is present. At 301, an embodiment may detect thermal data associated with a user. In this context, thermal data may refer to heat data emitted by a thermal entity (e.g., a human user, an animal, etc.). In an embodiment, the thermal data may be detected by at least one thermal sensor (e.g., a thermopile sensor, etc.) associated with a device. The thermal sensor may be a sensor integral to the device. For example, a smart phone may be disposed with a thermal sensor capable of detecting heat signatures of surrounding thermal entities.

Alternatively, the thermal sensor may be disposed on another device and may transmit detected thermal data to the device. For example, a smart thermostat disposed with a thermal sensor may detect nearby thermal data and subsequently transmit that data to another device (e.g., to a user's smartphone, tablet, smart speaker, etc.). Thermal data may be communicated from other sources to the device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the thermal sensor may continuously detect thermal data by maintaining the thermal sensor in an active state. The thermal sensor may, for example, continuously detect data even when other sensors (e.g., cameras, light sensors, speakers, microphones, etc.) associated with the device are inactive. Alternatively, the thermal sensor may remain in an active state for a predetermined amount of time (e.g., 30 minutes, 1 hour, 2 hours, etc.). Subsequent to not detecting any thermal data associated with a user during this predetermined time window, an embodiment may switch the thermal sensor to a power off state. The predetermined time window may be preconfigured by a manufacturer or, alternatively, may be configured and set by one or more users. The active state of the thermal sensor may be based upon a schedule of a user. For example, the user may set a schedule indicating when the user will be near the device. Accordingly, the thermal sensor may only be active when the user's schedule indicates the user will be near the device.

In an embodiment, the thermal sensor may be a low power sensor (e.g., utilizing 50 μW of power, etc.). Such a low power sensor may require significantly less power to operate than other sensors, such as a microphone. For example, a thermal sensor according to the embodiments may require 100 times less power to operate than a conventional microphone integral to a device. In an embodiment, if multiple thermal sensors are utilized (e.g., multiple thermal sensors disposed on the device, multiple thermal sensors disposed on different devices but in communication with the device, a combination thereof, etc.), the multitude of sensors may utilize less power in combination than a singular microphone.

At 302, an embodiment may determine if the thermal data is associated with at least one human user. Determining that the thermal data is associated with at least one human user may require only identifying any thermal data present in an area. Alternatively, and/or additionally, determining that the thermal data is associated with at least one human user may require differentiating between thermal data associated with a human and thermal data associated with other thermal entities, like animals, plants, electronics, and the like. The thermal data may also be used to assist in differentiating authorized users, for example, adults versus children.

In an embodiment, one method of differentiating between the types of thermal data is by identifying the heat signature of the entity. For example, while many different entities provide a heat signature, for example, electronic devices, people, pets, plants, appliances, and the like, the heat signature for each of these entities will be different from heat signatures of another entity. For example, a heat signature for an electronic device may show a hot spot where the processor is located, but cool spots near the location of other components. As another example, a heat signature for a person may indicate heat radiating from all locations on the body with some locations being hotter than others.

Another method for differentiating between types of thermal data is by identifying a shape, outline, or heat representation of the thermal data. For example, a human may emit a heat signature similar to a humanoid shape whereas an animal may emit a differently shaped heat signature. Another method of differentiating between the types of thermal data may be by identifying the height level of the emitted thermal data. For example, humans may emit heat signatures at a higher point than animals. As another example, adults may emit heat signatures at a higher point than a child. An embodiment may associate any heat signature obtained above a predetermined height as belonging to a human and any heat signature obtained under the predetermined height as belonging to an animal.

In yet another example, an embodiment may identify how many sensing "bands", or a proportion of the entire area sensed, is occupied by a thermal entity. For example, thermal data associated with a human may occupy the entire sensing region, or multiple sensing bands, whereas thermal data associated with an animal may only occupy one band or portions of the entire sensing area. All of the aforementioned methods of differentiating between the types of thermal data may be utilized in isolation or may be utilized in combination.

In an embodiment, in order to provide a robust estimate of the presence of users near a device, multiple sensors may need to be used to ensure visibility in all directions. For example, a singular device may have a multitude of thermal sensors disposed on different sides of the device so that each sensor may be responsible for detecting thermal data for its side. In another embodiment, the multitude of sensors may be disposed on different devices located around an area, where each sensor can appropriately detect thermal data in and around its localized area.

Responsive to determining that the thermal data is associated with a non-human thermal entity or not associated with a human user at 303, an embodiment may not activate, at 304, a microphone or another sensor associated with the device and may continue to detect thermal data. However, responsive to determining, at 303, that the thermal data is associated with a human user, an embodiment may activate, at 305, at least one audio input device (e.g., a microphone, etc.) associated with the information handling device.

In an embodiment, another sensor or application may be activated in addition to or in place of the audio input device. For example, responsive to determining that the thermal data is associated with a human user, an embodiment may activate a camera, a digital assistant, another input device (e.g., a display screen, etc.), a combination thereof, and the like. In an embodiment, subsequent to the activation of the one or more sensors and/or applications, a user may provide input (e.g., touch input, voice input, etc.) to the device. In an embodiment, responsive to receiving voice input provided by a human user, an embodiment may activate a digital assistant capable of processing the voice input and performing functions associated with the input.

Various embodiments may also utilize depth detection methods in conjunction with the thermal data to determine whether a user is within an appropriate range of the device to provide input. For example, if a thermal sensor detects that a human user is in the room but a depth sensor (e.g., a dedicated depth sensor associated with the device, a camera disposed on the device capable of determining image depth, etc.) determines that the user is at a distance that is too far away from the device to provide accurate voice input, an embodiment may maintain the microphone in a power off state.

In an embodiment, responsive to no longer detecting thermal data associated with a user, an embodiment may deactivate the audio input device and/or another sensor or application associated with the device. For example, subsequent to detecting that a user is present in the room, an embodiment may activate a microphone in order to be able to receive and process user input if it is provided. If a user leaves the room, an embodiment may detect that there is no longer any thermal data associated with a human user and may subsequently deactivate the microphone in order to save power because there is no user around to provide input.

The various embodiments described herein thus represent a technical improvement to conventional input device activating techniques. Using the techniques described herein, an embodiment may determine whether a human user is present in an area by detecting, using at least one thermal sensor, thermal data associated with a human user. Responsive to detecting human userbased thermal data, an embodiment may activate at least one audio input device, or at least one other sensor, associated with a device. Such a method enables a device to conserve power by only activating power-consuming sensors when a human user is present to provide input.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, using at least one thermal sensor associated with an information handling device and without receiving user touch input, thermal data associated with an entity,
   determining, using a processor, whether the thermal data is associated with a human or another thermal entity, the determining comprising identifying whether a height level of the entity is above a predetermined threshold and whether a heat signature of the entity is greater than a predetermined threshold; and
   activating, based on determining that the thermal data is associated with a human, at least one audio input device associated with the information handling device.

2. The method of claim 1, further comprising activating a digital assistant in response to receiving audio input at the at least one audio input device.

3. The method of claim 1, wherein the at least one thermal sensor is disposed on another device.

4. The method of claim 1, further comprising deactivating, based upon determining that the thermal data is not associated with a human, at least one other sensor of the information handling device.

5. The method of claim 1, wherein the detecting comprises continuously detecting the thermal data by maintaining the at least one thermal sensor in an active state.

6. The method of claim 1, wherein the determining comprises differentiating the thermal data associated with the human from thermal data associated with another thermal entity.

7. The method of claim 6, wherein the differentiating comprises using height data associated with the human.

8. The method of claim 6, further comprising, responsive to determining the thermal data is associated with the another thermal entity, not activating the at least one microphone.

9. The method of claim 1, further comprising responsive to determining that the thermal data is not associated with the human, not activating the at least one audio input device.

10. The method of claim 1, further comprising activating, based on determining the thermal data is associated with the human, at least one other sensor.

11. An information handling device, comprising:
at least one thermal sensor;
a processor;
a memory device that stores instructions executable by the processor to:
detect, without receiving user touch input, thermal data associated with an entity;
determine whether the thermal data is associated with a human or another thermal entity, the determining comprising identifying whether a height level of the entity is above a predetermined threshold and whether a heat signature of the entity is greater than a predetermined threshold; and
activate, based on determining that the thermal data is associated with a human, at least one audio input associated with the information handling device.

12. The information handling device of claim 11, wherein the instructions are further executable by the processor to activate a digital assistant in response to receiving audio input at the least one audio input.

13. The information handling device of claim 11, further comprising an input for another thermal sensor.

14. The information handling device of claim 11, wherein the instructions are further executable by the processor to deactivate, based upon determining that the thermal data is not associated with a human, at least one other sensor of the information handling device.

15. The information handling device of claim 11, wherein the instructions executable by the processor to detect comprise instructions executable by the processor to continuously detect the thermal data by maintaining the at least one thermal sensor in an active state.

16. The information handling device of claim 11, wherein the instructions executable by the processor to determine comprise instructions executable by the processor to differentiate the thermal data associated with a human from thermal data associated with another thermal entity.

17. The information handling device of claim 16, wherein the instructions are further executable by the processor to not activate, responsive to determining the thermal data is associated with the another thermal entity, the at least one audio input.

18. The information handling device of claim 11, wherein the instructions are further executable by the processor to not activate, responsive to determining that the thermal data is not associated with a human, the at least one audio input.

19. The information handling device of claim 11, wherein the instructions are further executable by the processor to activate, based on determining the thermal data is associated with a human, at least one other sensor.

20. A product, comprising:
a storage device that stores code, the code being executable by a processor and comprising:
code that detects, without receiving user touch input, thermal data associated with an entity;
code that determines whether the thermal data is associated with a human or another thermal entity, the determining comprising identifying whether a height level of the entity is above a predetermined threshold and whether a heat signature of the entity is greater than a predetermined threshold; and
code that activates, based on determining that the thermal data is associated with a human, at least one microphone associated with the product.

* * * * *